Patented Oct. 23, 1945

2,387,530

UNITED STATES PATENT OFFICE 2,387,530

POLYMER TREATMENT

William W. Prichard, Wilmington, Del., assignor to E. I. du Pont de Nemours & Company, Wilmington, Del., a corporation of Delaware No Drawing. Application April 16, 1942, Serial No. 439,281

7 Claims. (Cl. 260—75)

This invention relates to the modification of polymeric materials.

Polymeric materials such as cellulose, cellulose derivatives, nylon, polyvinyl alcohol and other linear, active hydrogen containing polymers are of widespread utility in film or fiber form. Cellulose itself occurs naturally in fiber form but may also, thru the viscose, cuprammonium, or other process, be prepared in the form of fibers or films. This requires that the original cellulose be put into solution. The other polymers are also prepared in desired shapes from solutions. This solubility characteristic is of importance for the preparation of the shaped article but once this end has been attained, the solubility is no longer of advantage, and may even be disadvantageous. The materials are also often deficient in toughness, durability, etc.

This invention has as an object the provision of a process for improving polymeric materials. A further object is to increase the durability of polymeric materials having recurring active hydrogen containing groups. Another object is to improve the toughness of these polymers. A still further object is to increase their resistance to the action of solvents. Another object is to improve their elastic properties. Other objects will appear hereinafter.

These objects are accomplished by the following invention wherein a linear, active hydrogen containing, high molecular weight, organic polymer is reacted with the cyclic anhydride of a dicarboxylic acid having an acyclic chain of at least four atoms between the carboxyl groups, until solubility in solvents which dissolve the untreated polymer is substantially decreased.

In the preferred procedure for this invention, 5-55 parts of the cyclic anhydride of a dicarboxylic acid having at least 4 carbon atoms between the carboxyl groups and 100 parts of an active hydrogen containing polymeric material are brought into intimate contact, with or without a solvent, and heated at 20° C. to 250° C. for a period of about 15 minutes to about 2 hours. While catalyst may be employed the process ordinarily proceeds adequately without the use of any catalyst.

The more detailed practice of the invention is illustrated by the following examples, wherein parts given are by weight. There are, of course, many forms of the invention other than these specific embodiments.

Example I

To 90 parts cellulose acetate dissolved in 600 parts acetone is added 10 parts adipic anhydride monomer. The solution is allowed to stand for 16 hours and then cast into a film, which is then heated at 140° C. for 16 minutes. The resulting film is clear and insoluble in acetone, dioxan, 75% ethanol, and dilute caustic alkali whereas an untreated film is readily soluble in these solvents.

Fabrics, films and other products made from the treated cellulose acetate are more resistant to solvents than is the original cellulose acetate. They are also more resistant to heat (ironing) since the softening point of the treated material is raised.

Example II

Rubber containing hydroxyl groups is prepared according to Latham application S. N. 403,763, filed July 23, 1941 as follows:

Two hundred parts 30 minute milled rubber and 100 parts trioxane in 3800 parts carbon tetrachloride are heated at 65° C. for four hours with 20 parts zinc chloride in 180 parts acetic acid. The product is poured into a solution of 100 parts ammonium chloride and 200 parts ammonia in 1500 parts water and stirred. The organic layer is separated and the solvent removed.

Ten parts of this trioxane modified rubber is dissolved in 130 parts dry toluene and allowed to swell. One part adipic anhydride monomer dissolved in 45 parts solvent is added, the mixture allowed to stand for one hour, and heated at 90° C. for two hours. The solvent is removed, and the resulting product is tough and elastic, in comparison with the sticky, gummy starting material. The tough elastic polymer of pronounced rubbery properties thus prepared from the soft, gummy, trioxane modified rubber is, after vulcanization, more resistant to oil and gasoline than is ordinary rubber.

Example III

A waxy polyesteramide is prepared according to application S. N. 343,646, filed by Christ and Hanford July 2, 1940 (now U. S. Patent 2,333,639), as follows:

A mixture containing 2.91 parts hexamethylenediamine, 11.47 parts of ethylene glycol (10% excess), and 39.47 parts of sebacic acid is heated for two hours at 150° C. and atmospheric pressure, followed by 6 hours at 200° C. and 2 mm. pressure.

Twenty-five parts of the above polyesteramide wax is heated at 180° C. under nitrogen atmosphere, and two parts adipic anhydride monomer is added, whereupon the viscosity increases at once. After 15 minutes' heating, one part more adipic anhydride monomer is added, and after 10 minutes' further heating, another part is added. An increase in viscosity occurs on each addition, and the polymer finally sets to a rubbery mass. The product is soft and easily extensible. It shows considerable resistance to the action of organic solvents. The conversion of the soft, wax-like polyesteramide to an elastic pliable material renders the material useful in elastic pliable films, molded articles, insulating materials, belt material, coating compositions and the like.

*Example IV*

A sheet of polyvinyl alcohol film (0.5 part) is heated in a solution of 100 parts of dry xylene containing 5 parts adipatic anhydride monomer, the solution being maintained at its boiling point under reflux for 15 minutes. The film is then washed with acetone. It is insoluble in water at 90° C. whereas a control film is readily soluble. The thus treated polyvinyl alcohol film is likewise resistant to organic solvents and to moisture.

*Example V*

To 30 parts of a 15% solution of nitrocellulose in dry ethyl acetate is added one part adipic anhydride monomer at room temperature. A film is cast from this solution and heated at 90° C. for 20 minutes. This film is not dissolved by ethyl acetate, whereas an untreated film is readily soluble. Nitrocellulose thus modified gives films or other shaped products that are considerably more resistant than the original nitrocellulose to the action of solvents such as acetone, methanol, methoxyethanol, and to moisture.

*Example VI*

Four parts of cellulose acetate (37% acetyl content) is dissolved in sixteen parts 1,4-dioxane, and eight parts cyclic monomeric adipic anhydride is added. The mixture is heated at 115° C. for two hours, at which time the material has become insoluble in the 1,4-dioxane, i. e., has separated from the solution. The modified cellulose acetate is insoluble also in acetone, 75% ethanol, and dilute alkali. This is a remarkable result in view of the fact that, on treatment of cellulose acetate with succinic anhydride for as long as three days at the same temperature, the product is still soluble in organic solvents, e. g. dioxane, 75% ethanol, and acetone and is also soluble in dilute alkali.

In the process of the present invention there may be employed any cyclic anhydride of a dicarboxylic acid whose carboxyls are separated by an acyclic chain of at least four atoms which preferably are carbon but may include ether oxygen, thioether sulfur, amido nitrogen and tertiary amino nitrogen, including, in addition to the adipic anhydride exemplified above, the cyclic anhydrides of pimelic, suberic, azelaic, sebacic, undecanedioic, brassylic, tetradecanedioic, octadecanedioic, β,β'-methyliminodipropionic

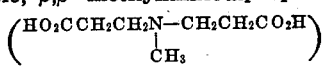

β,β'-oxydipropionic

β,β'-thiodipropionic

N(carboxylmethyl)succinamic

etc. acids.

The cyclic anhydrides include suberic and sebacic anhydrides which are cyclic dimers (Hill and Carothers, J. Am. Chem. Soc., 55, 5023 (1933)) but exclude the polymeric (linear polymeric) i. e. high molecular weight, anhydrides. The cyclic anhydrides may be prepared by low pressure pyrolysis of the polymeric anhydrides of the requisite dicarboxylic acids, according to Hill (J. Am. Chem. Soc., 42, 4113 (1930)) and Hill and Carothers (J. Am. Chem. Soc., 55, 5025 (1933)).

The cyclic anhydrides must have a chain of at least four atoms between the carboxyls to attain the results sought. Thus the reaction of cellulose acetate with succinic anhydride gives, in three days, a product soluble in acetone, dioxane, 75% ethanol, and dilute alkali whereas the product of the reaction of cellulose acetate with adipic anhydride according to the present process using a reaction time of but two hours, is insoluble in these solvents.

The alkali insolubility of the reaction product of cellulose acetate with adipic anhydride according to the present invention indicates that cross linking occurs and that the reaction takes place in such fashion that no free carboxyl group is present in the reaction product. The larger ring anhydrides, i. e. those of acids having a chain of at least four atoms between the carboxyls, differ in this respect from the smaller ring anhydrides which react to form carboxyl containing derivatives. Likewise the insolubility of other anhydride-treated active hydrogen-containing polymers such as polyesteramides, polyvinyl alcohol, hydroxylated rubber etc., in solvents in which the unmodified polymers are soluble is strong evidence that a cross-linking reaction has taken place in which both functional groups of the anhydride have reacted with the active hydrogen-bearing groups.

Adipic anhydride is particularly preferred because of its high reactivity and the convenience of the process when it is used.

In the process of this invention any active-hydrogen containing, high molecular weight, organic, polymeric material may be employed, i. e. any polymeric material having active hydrogen-containing groups. These active hydrogen-containing groups have hydrogen attached through oxygen, sulfur or nitrogen to the rest of the molecule and may be identified by the use of the Zerewitinoff test (Kohler, J. Am. Chem. Soc., 49, 3181 (1927)). Suitable high molecular weight polymeric materials include cellulose (cotton, wood pulp, regenerated cellulose obtained by the cuprammonium or viscose processes); starch, incompletely substituted cellulose esters such as the acetate, propionate, butyrate, nitrate, etc., and mixed esters such as the acetate propionate, acetate butyrate etc.; incompletely substituted cellulose ethers such as methylcellulose, ethylcellulose, benzylcellulose, glycolcellulose, celluloseglycollic acid, etc.; polyvinyl alcohol and partially acetalized (including ketalized) polyvinyl alcohols such as polyvinyl acetal, polyvinyl butyral etc.; partially hydrolyzed polyvinyl esters such as the formate, acetate, butyrate, etc.; hydroxylated rubbers, natural or synthetic; polyamides such as polyhexamethyleneadipamide, polydecamethylenesebacamide etc.; polyesteramides; polymeric thiols such as polyvinylthiol; and, in fact, any high molecular weight organic polymeric material containing a hydrogen atom attached to an oxygen, nitrogen or sulfur atom.

Of particular interest are the products obtained by treating polyesteramides with cyclic anhydrides of open chain dicarboxylic acids. In addition to the one disclosed in Example III, the following polyesteramides may be mentioned: polyhexamethyleneadipamide/ethylene adipate (85% ester); ethanolamine adipate/ethylene adipate (1:1.75); polyhexamethyleneadipamide/2,2-dimethylpropylene adipate (85% ester); ethanolamine sebacate/ethylene sebacate (80% ester); polyhexamethylenesebacamide/ethylene sebacate (85% ester), etc.

The use of a solvent is not always necessary and in some cases is not desirable. The solvent used should preferably dissolve the cyclic anhydride and the polymeric substance, although in some cases solution of the latter is impractical. The solvent must be chemically inert to the dissolved substances, and should be free of water or other materials capable of reacting with anhydrides.

The temperatures employed cover a range from room temperature, i. e. about 20° C., to about 250° C., and the preferred ranges are dependent upon the type of polymeric material. It is usually desirable to heat the materials at a temperature of at least 70° C., but in every case the temperature should be low enough to avoid degradation of the polymeric substance by heat alone. Preferred temperatures for this reaction lie between 70° C. and 140° C.

Although favorable properties can be obtained by using 5-55 parts of the cyclic anhydride to 100 parts of the polymeric material, it is preferred to use 10-20 parts of the anhydride to 100 parts of the active hydrogen-containing polymer.

The use of pressures above or below atmospheric, as well as atmospheric, is included in this invention.

The reaction period may be as short as 15 minutes, or even less in favorable cases, or it may be as long as several hours or even more. The time usually sufficient to produce a substantial degree of cross-linking (which is evidenced by a substantial decrease in solubility in solvents which dissolve the untreated polymer, and in many cases by a substantial increase of the softening point) is between 15 minutes and 2 hours at the preferred temperature range. In general, a higher temperature permits a shorter heating period, and vice versa.

The products of the present invention are useful in films, fibers, coatings, pressed or molded articles, and as rubber substitutes.

The above description and examples are intended to be illustrative only. Any modification of or variation therefrom which conforms to the spirit of the invention is intended to be included within the scope of the claims.

What is claimed is:

1. Process for modifying the properties of linear, active hydrogen containing macromolecular polymers containing recurring intralinear carbonamide and carboxylic acid ester groups which comprises reacting the same at a temperature in the range of 20° C. to 250° C. but below the degradation temperature of the polyesteramide with the cyclic anhydride of an organic dicarboxylic acid having an acyclic chain of at least four atoms between the carboxyl groups.

2. Process for modifying the properties of linear, active hydrogen containing macromolecular polymers containing recurring intralinear carbonamide and carboxylic acid ester groups which comprises reacting the same at a temperature in the range of 20° C. to 250° C. but below the degradation temperature of the polyesteramide with the cyclic anhydride of an organic dicarboxylic acid having an acyclic chain of at least four carbon atoms between the carboxyl groups.

3. Process for modifying the properties of linear, active hydrogen containing macromolecular polymers containing recurring intralinear carbonamide and carboxylic acid ester groups which comprises reacting the same at a temperature in the range of 20° C. to 250° C. but below the degradation temperature of the polyesteramide with the cyclic anhydride of adipic acid.

4. The cross linked product of the reaction, at a temperature within the range 20° C. to 250° C. but below the degradation temperature of the polymeric material, of a linear, active hydrogen containing macromolecular polymer containing recurring intralinear carbonamide and carboxylic acid ester groups with from 5 to 55 parts, per 100 parts of the polymer of the acyclic anhydride of an organic dicarboxylic acid having an acyclic chain of at least four atoms between the carboxyl groups.

5. The cross linked product of the reaction, at a temperature within the range 20° C. to 250° C. but below the degradation temperature of the polymeric material, of a linear, active hydrogen containing macromolecular polymer containing recurring intralinear carbonamide and carboxylic acid ester groups with from 5 to 55 parts, per 100 parts of the polymer, of the cyclic anhydride of an organic dicarboxylic acid having an acyclic chain of at least four carbon atoms between the carboxyl groups.

6. The cross linked product of the reaction, at a temperature within the range 20° C. to 250° C. but below the degradation temperature of the polymeric material, of a linear, active hydrogen containing macromolecular polymer containing recurring intralinear carbonamide and carboxylic acid ester groups with from 5 to 55 parts, per 100 parts of the polymer, of the cyclic anhydride of adipic acid.

7. The cross-linked product of the reaction, at a temperature within the range 20° C. to 250° C. but below the degradation temperature of the polymeric material, of adipic anhydride with a linear, active hydrogen-containing, macromolecular polymer containing recurring intralinear carbonamide and carboxylic acid ester groups and derived from ethanolamine adipate and ethylene adipate in the ratio of 1:1.75.

WILLIAM W. PRICHARD.